United States Patent
Jia

(10) Patent No.: US 12,326,345 B2
(45) Date of Patent: Jun. 10, 2025

(54) POSE CORRECTION BASED ON LANDMARKS AND BARRIERS

(71) Applicant: Aptiv Technologies AG, Schaffhausen (CH)

(72) Inventor: Bin Jia, Columbia, MD (US)

(73) Assignee: Aptiv Technologies AG, Schaffhausen (CH)

( * ) Notice: Subject to any disclaimer, the term of this patent is extended or adjusted under 35 U.S.C. 154(b) by 319 days.

(21) Appl. No.: 18/045,084

(22) Filed: Oct. 7, 2022

(65) Prior Publication Data

US 2024/0142266 A1 May 2, 2024

(51) Int. Cl.
G01C 21/00 (2006.01)
G01S 13/931 (2020.01)

(52) U.S. Cl.
CPC ........ G01C 21/3885 (2020.08); G01S 13/931 (2013.01)

(58) Field of Classification Search
CPC .......................... G01C 21/3885; G01S 13/931
See application file for complete search history.

(56) References Cited

U.S. PATENT DOCUMENTS

2018/0299557 A1* 10/2018 Yi ........................... G01S 17/89
2020/0232801 A1* 7/2020 Kim ........................ G06F 16/29

FOREIGN PATENT DOCUMENTS

DE 102016200642 A1 7/2017
EP 3798665 A1 3/2021

OTHER PUBLICATIONS

English Translation of CN113175925A Title: Positioning and Navigation System and Method Author: Wei et al. Date: Jul. 27, 2021 (Year: 2021).*
"Extended European Search Report", EP Application No. 22209243.9, Aug. 21, 2023, 16 pages.
Chen, et al., "Pole-Curb Fusion Based Robust and Efficient Autonomous Vehicle Localization System With Branch-and-Bound Global Optimization and Local Grid Map Method", IEEE Transactions on Vehicular Technology, vol. 70, No. 11, Sep. 27, 2021, pp. 11283-11294.

(Continued)

*Primary Examiner* — James J Lee
*Assistant Examiner* — Steven Vu Nguyen
(74) *Attorney, Agent, or Firm* — Harness, Dickey & Pierce, P.L.C.

(57) ABSTRACT

The techniques and systems herein enable pose correction based on landmarks and barriers. A vehicle pose, one or more radar-occupancy grid (ROG) landmark locations relative to the vehicle, and one or more map landmark locations are received. Based on determined association probabilities of candidate pairs (e.g., treating the map landmark locations as observations), one of the ROG landmark locations and one of the map landmark locations are selected as corresponding to each other. An ROG barrier location and a map barrier location are identified, and ripple point locations are identified that are along the barriers at a radial distance from the landmarks. Based on the ripple point locations and a cost function, a pose correction for the pose is determined. By using the described techniques, reliable vehicle localization can be performed using radar data and a map in a wide array of environments without necessitating other sensors.

19 Claims, 9 Drawing Sheets

(56) References Cited

OTHER PUBLICATIONS

Shin, et al., "High Definition Map-Based Localization Using ADAS Environment Sensors for Application to Automated Driving Vehicles", Applied Sciences 10, No. 14: 4924, 11 pages.
Jürgens, et al., "Radar-based Automotive Localization using Landmarks in a Multimodal Sensor Graph-based Approach", Apr. 29, 2021, 6 pages.
Zuo, et al., "Robust Visual SLAM with Point and Line Features", Sep. 2017, 8 pages.

* cited by examiner

POSE CORRECTION BASED ON LANDMARKS AND BARRIERS

BACKGROUND

Vehicles can use various types of sensors to track stationary and moving objects proximate the vehicles (e.g., other vehicles, pedestrians, animals, buildings, guardrails, signs, posts). Often, the sensors (e.g., radar sensors) are used to localize a vehicle to a map (e.g., determine locations of the vehicle relative to the map). Cluttered environments may cause the sensors to provide noisy data, and sparse environments may cause the sensors to provide sparse data, both of which may cause inaccurate or unreliable vehicle localization.

SUMMARY

This document is directed to systems, apparatuses, techniques, and methods for enabling pose correction based on landmarks and barriers. The systems and apparatuses may include components or means (e.g., processing systems) for performing the techniques and methods described herein.

Some aspects described below include a method that includes receiving, by at least one processor, a radar occupancy grid (ROG), a map, and a pose of a host vehicle. The method also includes identifying, by the processor and based on the ROG, one or more ROG landmark locations corresponding to respective ROG landmarks and identifying, by the processor and based on the map, one or more map landmark locations corresponding to respective map landmarks. The method further includes calculating, by the processor and based on the ROG landmark locations and the map landmark locations, association probabilities of one or more candidate pairs of one of the ROG landmarks and one of the map landmarks and identifying, by the processor and based on the association probabilities, a map landmark and ROG landmark pair comprising an ROG landmark of the ROG landmarks and a map landmark of the map landmarks that correspond to each other. The method also includes identifying, by the processor and based on the ROG, an ROG barrier location of an ROG barrier and identifying, by the processor and based on the map, a map barrier location of a map barrier. The method further includes determining, by the processor, one or more ROG first level ripple point locations, the ROG first level ripple point locations being along the ROG barrier location at a radial distance from an ROG landmark location corresponding to the ROG landmark and determining, by the processor, one or more map first level ripple point locations, the map first level ripple point locations being along the map barrier location at the radial distance from a map landmark location corresponding to the map landmark. The method also includes determining, by the processor, based on the ROG first level ripple point locations, the map first level ripple point locations, and a cost function, a pose correction for the pose, applying, by the processor, the pose correction to the pose to generate an updated pose for the host vehicle, and outputting, by the processor, the updated pose for receipt by a vehicle component of the vehicle.

The means may include a system comprising at least one processor configured to perform the above or other methods. The components may include computer-readable media (e.g., non-transitory storage media) including instructions that, when executed by the system, another system or component, or a combination thereof, implement the method above and other methods. This Summary introduces simplified concepts for enabling pose correction based on landmarks and barriers that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques for enabling pose correction based on landmarks and barriers are described with reference to the following drawings that use some of the same numbers throughout to reference like or examples of like features and components.

DETAILED DESCRIPTION

Overview

Accurate vehicle localization is important for many semi-autonomous and autonomous driving technologies. While advanced radar sensors have been developed, localizing vehicles using radar in a wide variety of environments (e.g., sparse or cluttered) has proved to be difficult without relying on other sensor types (e.g., lidar, cameras) in conjunction with the radar. Traditional pose correction fails to properly associate radar detections to map objects in some environments and fails to account for specific attributes of objects such as barriers (e.g., guardrails) and landmarks (e.g., poles, signs) and their spatial relationships with the barriers.

The techniques and systems herein enable pose correction based on landmarks and barriers. Specifically, a vehicle pose, one or more radar-occupancy grid (ROG) landmark locations relative to the vehicle, and one or more map landmark locations are received. Based on determined association probabilities of candidate pairs (e.g., treating the map landmark locations as observations), one of the ROG landmark locations and one of the map landmark locations are selected as corresponding to each other. An ROG barrier location and a map barrier location are identified, and ripple point locations are identified that are along the barriers at a radial distance from the landmarks. Based on the ripple point locations and a cost function, a pose correction for the pose is determined. By using the described techniques, reliable vehicle localization can be performed using radar data and a map in a wide array of environments without necessitating other sensors.

Example Environment

Figure 1:
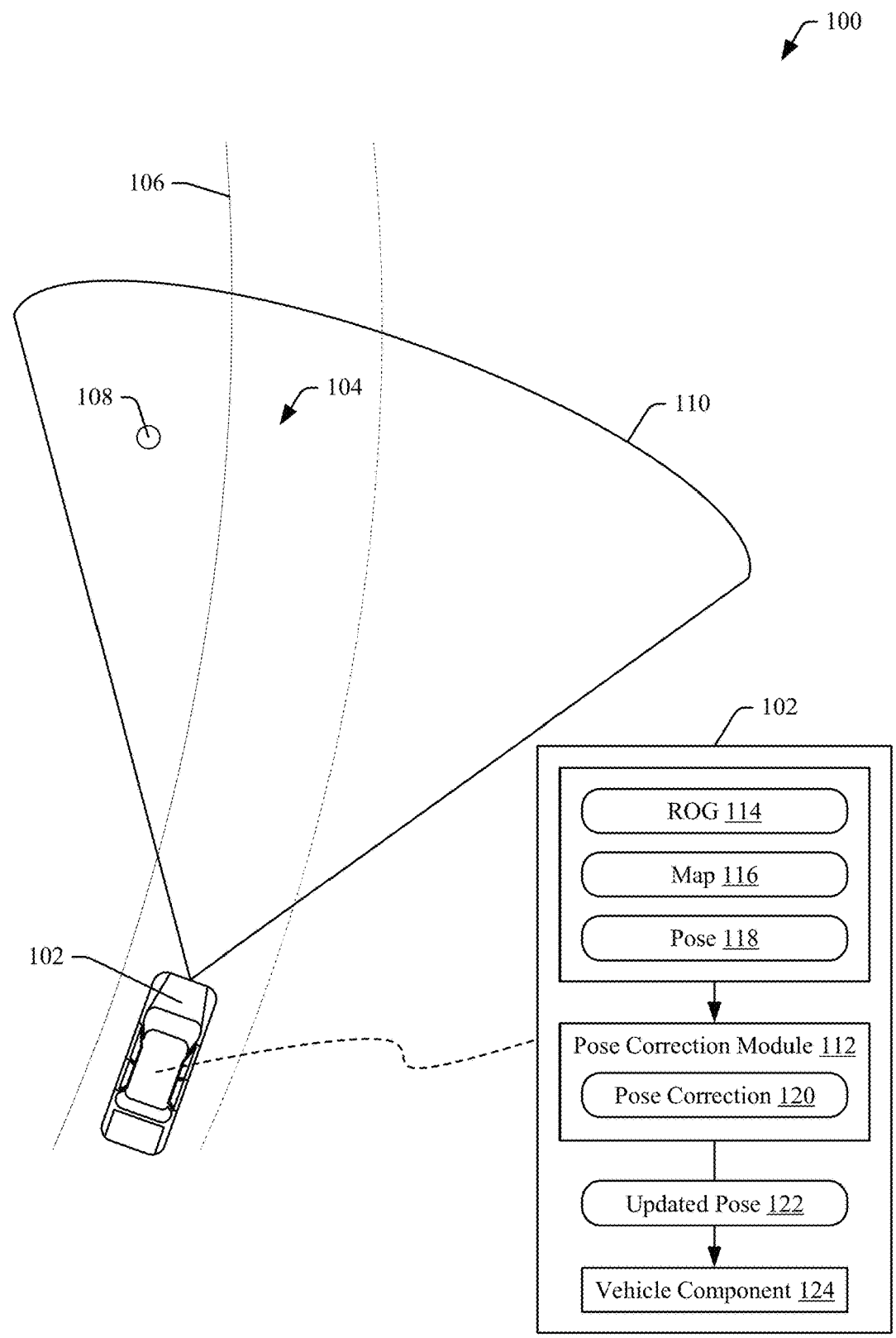
FIG. 1 illustrates, in accordance with techniques of this disclosure, an example environment where pose correction based on landmarks and barriers may be used.

FIG. 1 illustrates an example environment 100 where pose correction based on landmarks and barriers may be used. The example environment 100 includes a host vehicle 102 (automobile, car, truck, motorcycle, e-bike, boat, air vehicle, and so on) that is traveling along a roadway 104. The roadway 104 has at least one barrier 106 (e.g., guardrail) adjacent to the roadway 104, and the example environment 100 contains at least one landmark 108 (e.g., sign, traffic sign, street light, traffic signal, post). The barrier 106 and the landmark 108 are generally stationary and within a sensor range 110 (e.g., radar range) of the host vehicle 102.

The host vehicle 102 has a pose correction module 112 that receives a radar occupancy grid (ROG) 114, a map 116, and a pose 118 of the vehicle. The ROG 114 may be any ROG or Gaussian distribution derived from any ROG. Furthermore, the ROG 114 may contain semantic information about the objects within the ROG 114. The map 116 may be an HD-map with detailed information about objects within the map. The pose 118 may be a rough two-dimensional coordinate (e.g., x/y, lat/long, Frenet coordinates) of the host vehicle 102 along with a yaw of the host vehicle 102. The pose 118 may also contain information from an inertial management unit (IMU) and/or global positioning system (GPS). The pose 118 may come from a previous pose determination (e.g., a previous corrected pose or previous rough pose) and/or from various other sensors.

The pose correction module 112 may use the ROG 114, the map 116, and the pose 118 (as discussed further below) to calculate a pose correction 120. The pose correction 120 may be a translation and rotation vector that can be applied to the pose 118 to generate an updated pose 122 for the host vehicle 102. For example, a non-linear filter may be used to apply the pose correction 120 to the pose 118. The updated pose 122 may then be output for receipt by a vehicle component 124. The vehicle component 124 may use the updated pose 122 to carry out a vehicle function of the host vehicle 102 (e.g., semiautonomous or autonomous function).

Example System

Figure 2:
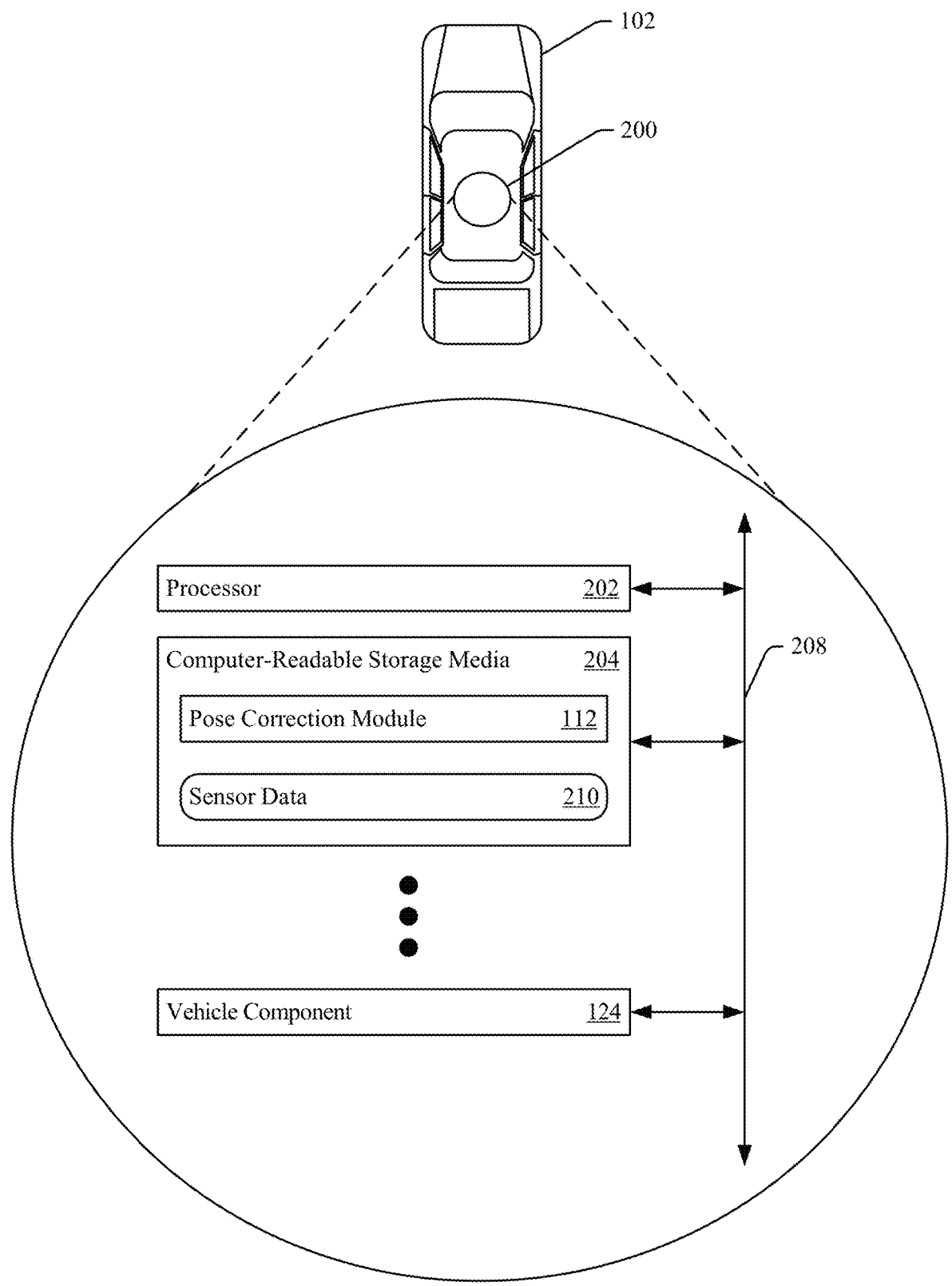
FIG. 2 illustrates, in accordance with techniques of this disclosure, an example system configured to implement pose correction based on landmarks and barriers.

FIG. 2 illustrates an example system 200 configured to be disposed in the host vehicle 102 and configured to implement pose correction based on landmarks and barriers. Components of the example system 200 may be arranged anywhere within or on the host vehicle 102. The example system 200 may include at least one processor 202, computer-readable storage media 204 (e.g., media, medium, mediums), and the vehicle component 124. The components are operatively and/or communicatively coupled via a link 208.

The processor 202 (e.g., application processor, microprocessor, digital-signal processor (DSP), controller) is coupled to the computer-readable storage media 204 via the link 208 and executes instructions (e.g., code) stored within the computer-readable storage media 204 (e.g., non-transitory storage device such as a hard drive, solid-state drive (SSD), flash memory, read-only memory (ROM)) to implement or otherwise cause the pose correction module 112 (or a portion thereof) to perform the techniques described herein. Although shown as being within the computer-readable storage media 204, the pose correction module 112 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 202 and the computer-readable storage media 204 may be any number of components, comprise multiple components distributed throughout the host vehicle 102, located remote to the host vehicle 102, dedicated or shared with other components, modules, or systems of the host vehicle 102, and/or configured differently than illustrated without departing from the scope of this disclosure.

The computer-readable storage media 204 also contains sensor data 210 generated by one or more sensors or types of sensors (not shown) that may be local or remote to the example system 200. The sensor data 210 indicates or otherwise enables the determination of information usable to perform the techniques described herein. For example, the sensor data 210 may comprise, or otherwise be usable to generate, the ROG 114 for use by the pose correction module 112 to calculate the pose correction 120.

In some implementations, the sensor data 210 may come from a remote source (e.g., via link 208). The example system 200 may contain a communication system (not shown) that receives sensor data 210 from the remote source. The sensor data 210 can be received by the processor 202 using vehicle to vehicle (V2V) and/or vehicle to everything (V2X) communication techniques to obtain sensor data from other vehicles in the example environment 100 and/or from traffic control systems or other infrastructure configured to output sensor data for promoting vehicle situational awareness.

No matter the source of the information, the vehicle component 124 contains one or more systems or components that are communicatively coupled to the pose correction module 112 and configured to use the updated pose 122 to perform a vehicle function. For example, the vehicle component 124 may comprise a downstream processing module or an Advanced Driver Assist System (ADAS) with means for accelerating, steering, braking, or otherwise controlling the host vehicle 102, at least in part using information derived from the updated pose 122. The vehicle component 124 is communicatively coupled to the pose correction module 112 via the link 208. Although shown as separate components, the pose correction module 112 may be part of the vehicle component 124 and visa-versa.

Example Flow

Figure 3:
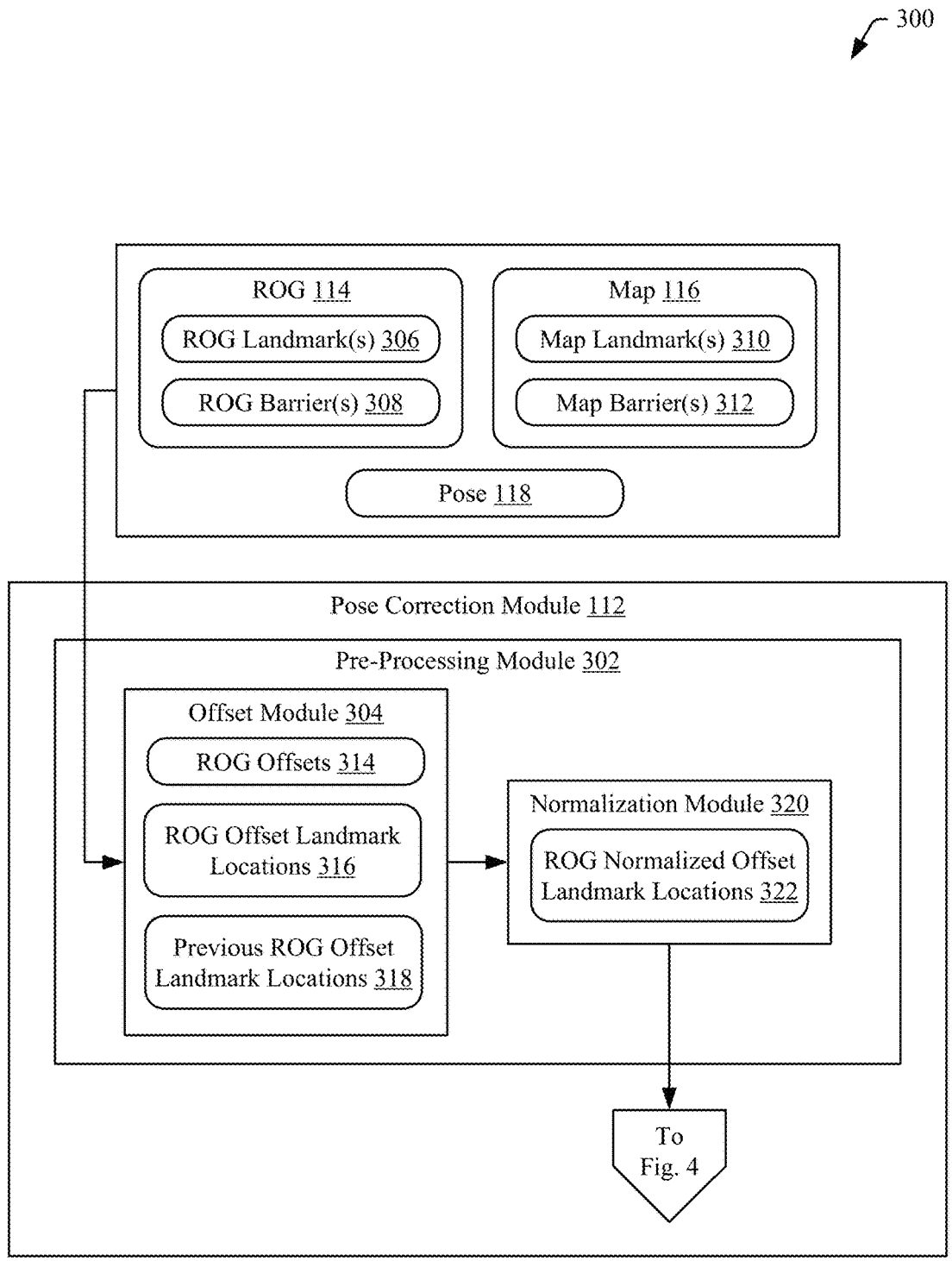
FIGS. 3 and 4 illustrate, in accordance with techniques of this disclosure, an example flow of pose correction based on landmarks and barriers.
Figure 4:
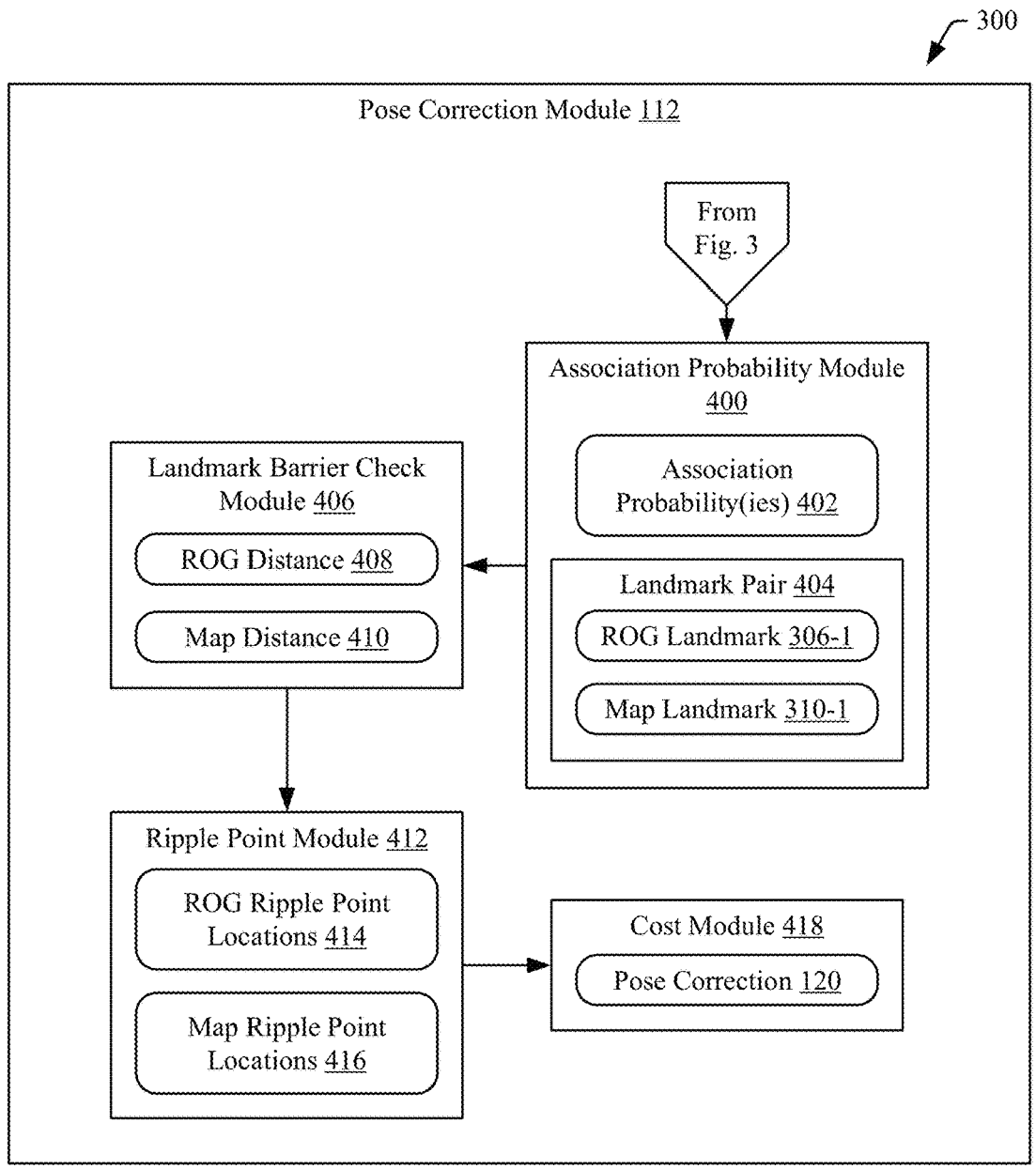

FIGS. 3 and 4 illustrate, at 300, an example flow of pose correction based on landmarks and barriers. The pose correction module 112 contains a pre-processing module 302 configured to pre-process the ROG 114. To do so, an offset module 304 of the pre-processing module 302 receives the ROG 114. Within the ROG 114 are identified one or more ROG landmarks 306 and one or more ROG barriers 308. The ROG landmarks 306 and the ROG barriers 308 are determined portions of the ROG 114 that correspond to landmarks (e.g., landmark 108) and barriers (e.g., barrier 106). The offset module 304 may determine the ROG landmarks 306 and the ROG barriers 308 or receive them as part of the ROG 114 from another module. For example, the pose correction module 112 may use a machine learning algorithm to determine or infer locations of the ROG landmarks 306 and ROG barriers 308. The algorithm may interpret portions of the ROG 114 and determine appropriate locations of the ROG landmarks 306 (e.g., based on size, shape, location relative to roadway, reflectivity). Within the map 116 are identified one or more map landmarks 310 and one or more map barriers 312. The map landmarks 310 and the map barriers 312 are determined portions of the map 116 (e.g., map objects) that correspond to landmarks (e.g., landmark 108) and barriers (e.g., barrier 106).

The offset module 304 determines ROG offsets 314. The ROG offsets 314 correspond to differences between locations of the ROG landmarks 306 and the map landmarks 310. A location of a map landmark 310 usually corresponds to a geometric center of the associated real-world landmark, which may not be the same as a location of the ROG landmark 306. For example, in the case of a sign, the ROG landmark 306 may have a location corresponding to a pole of the sign, while the map landmark 310 may have a location corresponding to a center of the sign.

For each landmark, the offset module 304 may determine an orientation and/or size information (e.g., from the map landmark 310 or based on the ROG landmark 306) of the landmark to determine an ROG offset 314 for the ROG landmark 306. In some implementations, the ROG offset 314 may be half of the physical size of the map landmark 310 (because signs are reported at geometric centers, not at the posts). The offset module 304 may then determine which direction the ROG offset 314 is (e.g., left or right) depending upon where the landmark is relative to the roadway 104. It should be noted that ROG offsets 314 may only be determined for large ROG landmarks 306, as smaller ROG landmarks 306 may have minorly consequential location differences.

The ROG offsets 314 are applied to locations of the ROG landmarks 306 that have ROG offsets 314 calculated for them to produce ROG offset landmark locations 316. The ROG offset landmark locations 316 correspond to locations of the ROG landmarks 306 that are comparable to locations of the map landmarks 310. It should be noted that the map landmarks 310 may be offset instead of the ROG landmarks 306.

The ROG offset landmark locations 316 along with previous ROG offset landmark locations 318 (e.g., determined prior for similar ROG landmarks 306) are received by a normalization module 320 of the pre-processing module 302 that calculates ROG normalized offset landmark locations 322 for the ROG landmarks 306. The ROG normalized offset landmark locations 322 corresponds to a time-averaged and/or smoothed determinations of locations of the ROG landmarks 306 (e.g., ROG offset landmark locations 316) over a series of radar frames. The ROG offset landmark locations 316 may comprise estimations of the locations with means and covariances. To calculate the ROG normalized offset landmark locations 322, the normalization module 320 may apply a Kalman smoother that may include forward and backward processes to mitigate any anomalies in the ROG offset landmark locations 316 (e.g., due to multiple scans) and, thus, produce a reliable locations of the ROG landmarks 306. The example flow 300 continues on FIG. 4.

FIG. 4 starts with the ROG normalized offset landmark locations 322 being output by the normalization module 320 for receipt by an association probability module 400. The association probability module 400 is configured to determine association probabilities 402 between each pair of the ROG landmarks 306 and the map landmarks 310. The association probabilities 402 are used to produce at least one landmark pair 404 that comprises an ROG landmark 306-1 and a map landmark 310-1 that are associated with each other.

Typically, the ROG landmarks 306 contain uncertainty information about their positions. Many times, however, the map landmarks 310 do not. Accordingly, the map landmarks 310 are considered as observations from landmark distributions provided by the ROG 114.

To calculate the association probabilities 402, it may be assumed that the squared Mahalanobis distance follows the chi-square distribution with 2 degrees of freedom, and its cumulative distribution is defined as $1-e^{-x/2}$, where x is the squared Mahalanobis distance. Thus, the association probability 402 of an ROG landmark 306/map landmark 310 pair may be given by Equation 1.

$$p_{pos} = e^{-d^2(X_{ROG}, X_{HDMap})/2} \quad (1)$$

where d is the Mahalanobis distance between the locations of the ROG landmark 306/map landmark 310 pair (e.g., locations $X_{ROG}$ and $X_{HDMap}$, respectively). $d^2(X_{ROG}, X_{HDMap})$ may be given by Equation 2.

$$d^2(X_{ROG}, X_{HDMAP}) = (X_{ROG} - X_{HDMAP})^T \Sigma_{ROG}^{-1} (X_{ROG} - X_{HDMAP}) \quad (2)$$

The location of the landmark from the ROG 114 may be represented by represented by $N(X_{ROG}, \Sigma_{ROG})$.

If there are multiple landmarks in an environment (e.g., ROG landmarks 306 and/or map landmarks 310), then the association probability module 400 may perform a global optimization to determine the association probabilities 402. Similar to that above, association probabilities 402 are represented by p $(O_{ROG_i}, O_{DHMAP_j})$. The association probability module 400 may then apply a negative log likelihood (NLL) given by Equation 3.

$$NLL(O_{ROG_i}, O_{HDMAP_j}) = -\log(p(O_{ROG_i}, O_{HDMAP_j})) \quad (3)$$

To solve a global optimization problem such as this, a cost matrix function may be used. A Hungarian or Murty algorithm may then be used to obtain the assignment pairs from the cost matrix, as shown in Table 1.

TABLE 1

|  | $O_{HDMAP_1}$ | ... | $O_{HDMAP_N}$ | $O_{ROG_1}$ | ... | $O_{ROG_M}$ |
|---|---|---|---|---|---|---|
| $O_{ROG_1}$ | $NLL(O_{ROG_1}, O_{HDMAP_1})$ | ... | $NLL(O_{ROG_1}, O_{HDMAP_N})$ | $C_T$ | ... | ∞ |
| $O_{ROG_2}$ | $NLL(O_{ROG_2}, O_{HDMAP_1})$ | ... | $NLL(O_{ROG_2}, O_{HDMAP_N})$ | ∞ | ... | ∞ |
| . | . | . | . | . | . | . |
| . | . | . | . | . | . | . |
| $O_{ROG_M}$ | $NLL(O_{ROG_M}, O_{HDMAP_1})$ | ... | $NLL(O_{ROG_M}, O_{HDMAP_N})$ | ∞ | ... | $C_T$ |

Regardless of how the association probabilities 402 are determined, the association probability module 400 generates the landmark pair 404. Multiple landmark pairs 404 may be determined, however, as little as one landmark pair 404 may be used to calculate the pose correction 120.

The landmark pair 404 is received by a landmark barrier check module 406 along with at least one of the ROG barriers 308 (e.g., ROG barrier 308-1) and at least one of the map barriers 312 (e.g., map barrier 312-1). The landmark barrier check module 406 is configured to calculate an ROG distance 408 between the ROG landmark 306-1 and the ROG barrier 308-1 (e.g., a closest point on the ROG barrier 308-1) and a map distance 410 between the map landmark 310-1 and the map barrier 312-1 (e.g., a closest point on the map barrier 312-1).

A center point is determined for a cell of the ROG 114 that corresponds to the ROG barrier 308-1 and is closest to the ROG landmark 306-1. A center point of the ROG landmark 306-1 may also be identified (if it's not already). The occupied cells of the ROG 114 may be clustered to form a normal distribution transform (NDT) map comprising Gaussians for respective cells of the NDT map. The relevant center points may then be determined based on the Gaussians.

The relative geometry can then be represented by $[P_{l,rog}, P_{b,rog}]$ and $[P_{l,hdmap}, P_{b,hdmap}]$ for the ROG landmark 306-1 and the map landmark 310-1, respectively. A plausibility check may then be conducted by evaluating the distance between $d_{lb,rog}$ and $d_{lb,hdmap}$, where $d_{lb,rog}=\|P_{l,rog}-P_{b,rog}\|_2$, $d_{lb,hdmap}=\|P_{l,hdmap}-P_{b,hdmap}\|_2$. If the distance meets a predefined distance threshold, the plausibility check passes.

Figure 5:
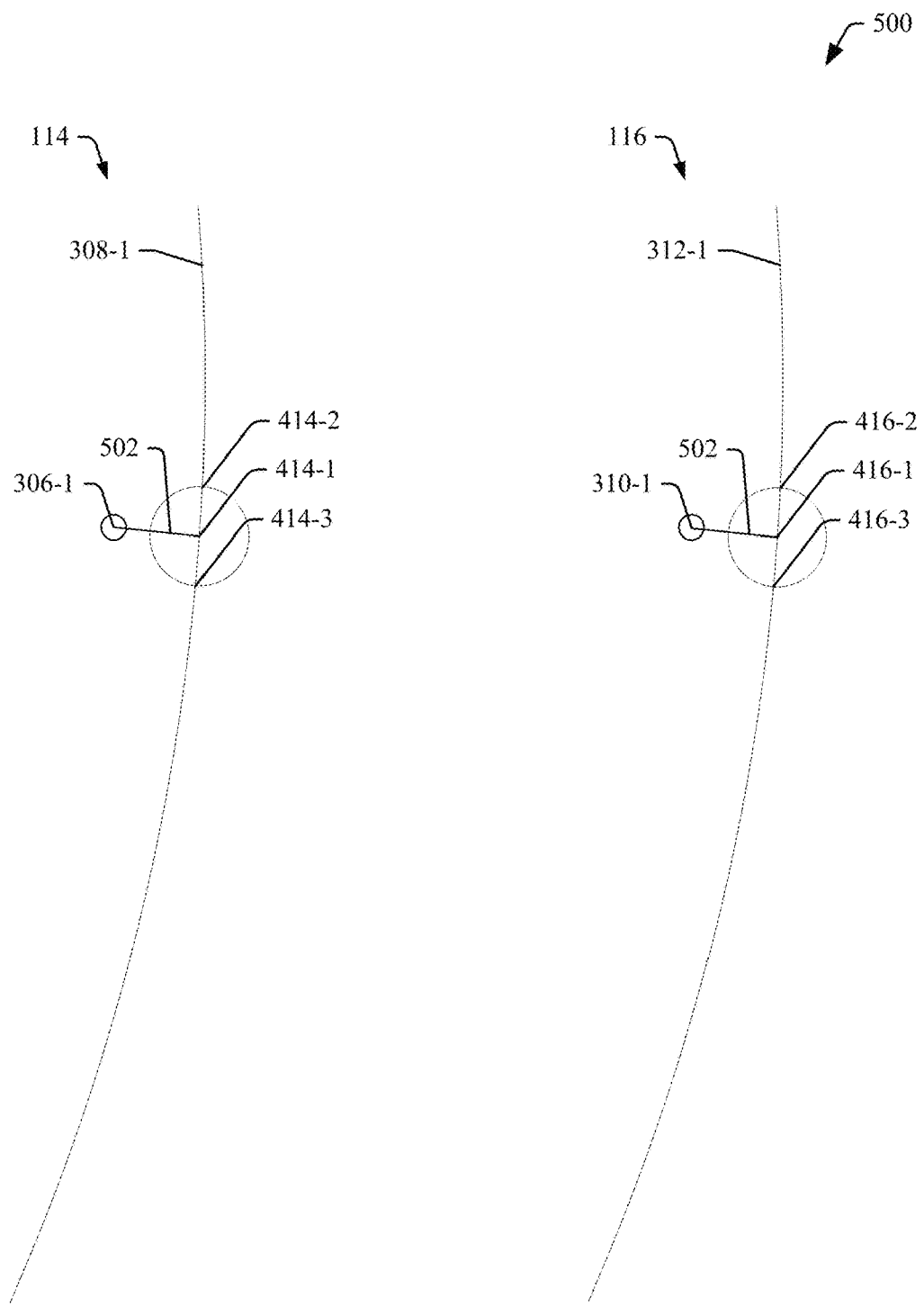
FIGS. 5-7 illustrate, in accordance with techniques of this disclosure, example ripple point locations.
Figure 6:
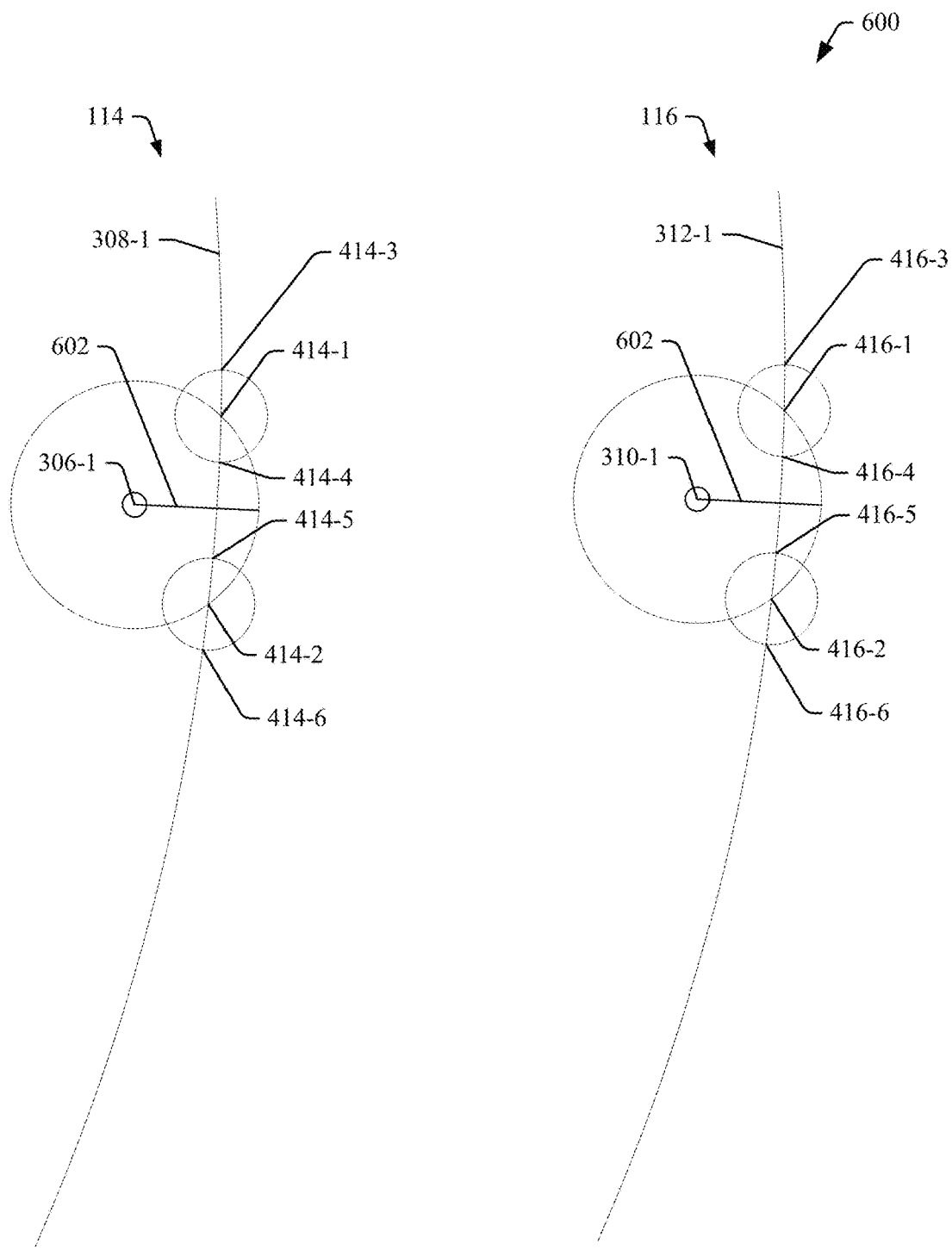
Figure 7:
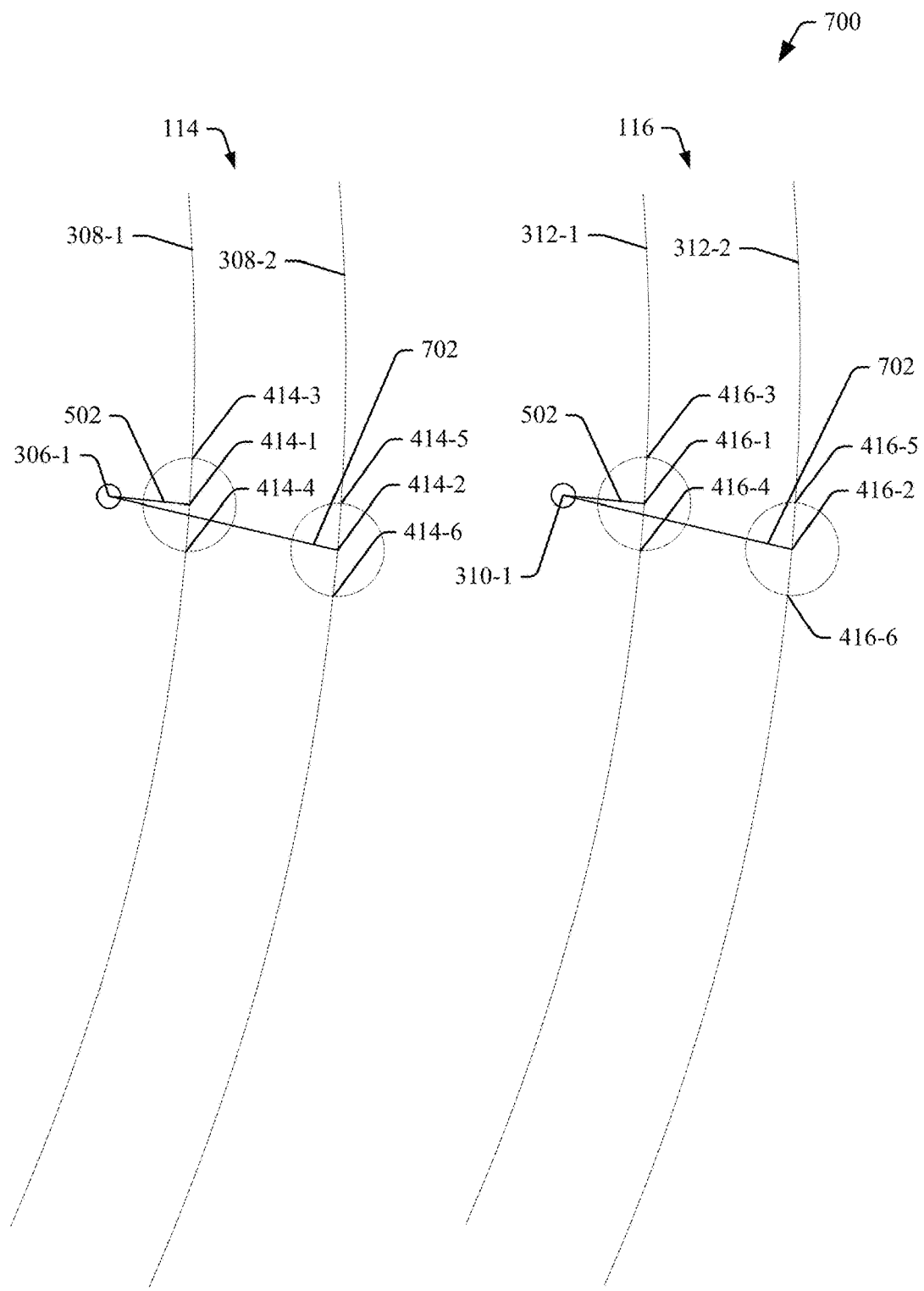

Assuming the landmark pair 404 passes, a ripple point module 412 determines ROG ripple point locations 514 and map ripple point locations 516 for the landmark pair 404. The ripple point locations correspond to points of the ROG barrier 308-1 and the map barrier 312-1 at a radial distance from the ROG landmark 306-1 and map landmark 310-1, respectively (see FIGS. 5 and 6). The ripple point locations may also correspond to one or more points of a travel path of the host vehicle 102 (e.g., determined from lane curvature information and/or barrier information) and/or another barrier at other radial distances from the landmarks (see FIG. 7). Ripple points along barriers and/or in a travel path at certain radial distances from the landmarks are considered first level ripple points. From there, intersections of the respective barriers and/or travel path at radial distances from the first level ripple points determine other, second level ripple points, which are different than the first level ripple points. More levels of ripple points may be generated in a similar fashion. It should be noted that the respective ripple points correspond between the ROG 114 and the map 116. Examples of the ROG ripple point locations 514 and the map ripple point locations 516 are illustrated in FIGS. 5-7.

The ROG ripple point locations 414 and the map ripple point locations 416 are received by a cost module 418 that is configured to calculate the pose correction 120. To do so, different weights are assigned to different point sets (e.g., ripple point levels) to formulate an optimization function such as Equation 4.

$$F = \Sigma_l^L \Sigma_i^n w_i \|Rp_{i,l}^{ROG} + T - p_{i,l}^{HDMAP}\|_{Q_{i,l}^{-1}}^2 \quad (4)$$

where L is the ripple point level, $p_i^{ROG}$ and $p_i^{HDMAP}$ are the ith ripple point at level l for ROG 114 and map 116, respectively, R and T are the rotation and translation variables of the pose correction 120, and Q is the covariance.

To be more generic, the cost function with multiple scans may be given by Equation 5.

$$x^* = \mathrm{argmin}_x \Sigma_m F_m + \Sigma_{i,j \in \Xi} e(x_i, x_j)^T \Omega_{ij} e(x_i, x_j) \quad (5)$$

where $F_m$ is the mth scan value of F, x denotes the variables, including pose 118 and landmark location, $e(x_i, x_j)$ is the scan matching error which can use the ripple points (or other feature), $\Omega_{ij}$ is the information matrix of the scan matching between ith frame and jth frame, and $\Xi$ is the set of all feasible paired scans.

The cost function may additionally include one or more odometry constraints (e.g., distance and direction traveled since a last known location). The odometry constraints (e.g., based on the sensor data 210) may enable the cost function to more accurately or more quickly determine the pose correction 120.

Example Ripple Points

FIG. 5 illustrates, at 500, example ripple point locations (e.g., ROG ripple point locations 414 and map ripple point locations 416) using a single barrier (e.g., ROG barrier 308-1 and map barrier 312-1) and a single landmark (e.g., ROG landmark 306-1 and map landmark 310-1) at a shortest radial distance 502 to the landmark. At the shortest radial distance 502, the first level ripple points are at ROG ripple point location 414-1 and at map ripple point location 416-1. The second level ripple points are at ROG ripple point locations 414-2 and 414-3 and at map ripple point locations 416-2 and 416-3. It should be noted that the radial distance used for the second level ripple points may be varied (as long as it is varied for both the ROG 114 and the map 116 similarly) without departing from the scope of this disclosure.

FIG. 6 illustrates, at 600, example ripple point locations using a single barrier (e.g., ROG barrier 308-1 and map barrier 312-1) and a single landmark (e.g., ROG landmark 306-1 and map landmark 310-1) at a longer radial distance 602 to the landmark than the shortest distance 502. At the longer radial distance 602, the first level ripple points are at ROG ripple point locations 414-1 and 414-2 and at map ripple point locations 416-1 and 416-2. The second level ripple points are at ROG ripple point locations 414-3 through 414-6 and at map ripple point locations 416-3 through 416-6.

FIG. 7 illustrates, at 700, example ripple point locations using two barriers (e.g., ROG barriers 308-1 and 308-2 and map barriers 312-1 and 312-2) and a single landmark (e.g., ROG landmark 306-1 and map landmark 310-1) at the shortest distance 502 for the first barriers and at a long radial distance 702 for the second barriers. The second barrier may also be a determined path of the host vehicle 102. Using the shortest radial distance 502 and the long radial distance 702, the first level ripple points are at ROG ripple point locations 414-1 and 414-2 and at map ripple point locations 416-1 and 416-2. The second level ripple points are at ROG ripple point locations 414-3 through 414-6 and at map ripple point locations 416-3 through 416-6. It should be noted that any combination of radial distances may be used without departing from the scope of this disclosure.

By using the techniques described herein, reliable and efficient vehicle localization may be performed using only radar and a map. Doing so enables vehicles to localize themselves in a wide variety of environments and situations where conventional techniques may fail, produce erroneous pose corrections, and/or require large computational resources.

Discussion

Although the above techniques reference a barrier (e.g., ROG barrier 308 and map barrier 312), vehicle localization may be achieved using the vehicle path instead of a barrier (e.g., if a barrier is not present). In such cases, some of the steps and/or modules may be skipped. Furthermore, the order of the operations and modules is for example and illustration purposes only. For example, the pose correction module may extract ripple points first and use the extracted ripple points in both association and pose corrections. Doing so, however, may use additional computational resources.

In some implementations, a pose correction confidence may be determined. The pose correction confidence may be determined via candidate validation feature points. From the ROG 114, the feature points may be extracted using a conventional feature descriptor, such as histogram of oriented gradients (HOG) or machine learning. Based on those feature points and positions of the ROG landmark 306, the corresponding map landmarks 310 may be extracted. The pose correction module 112 may then check if the map landmarks 310 have the same properties as the ROG landmarks 306, such as class, occupied probability, etc.

Example Method

Figure 8:
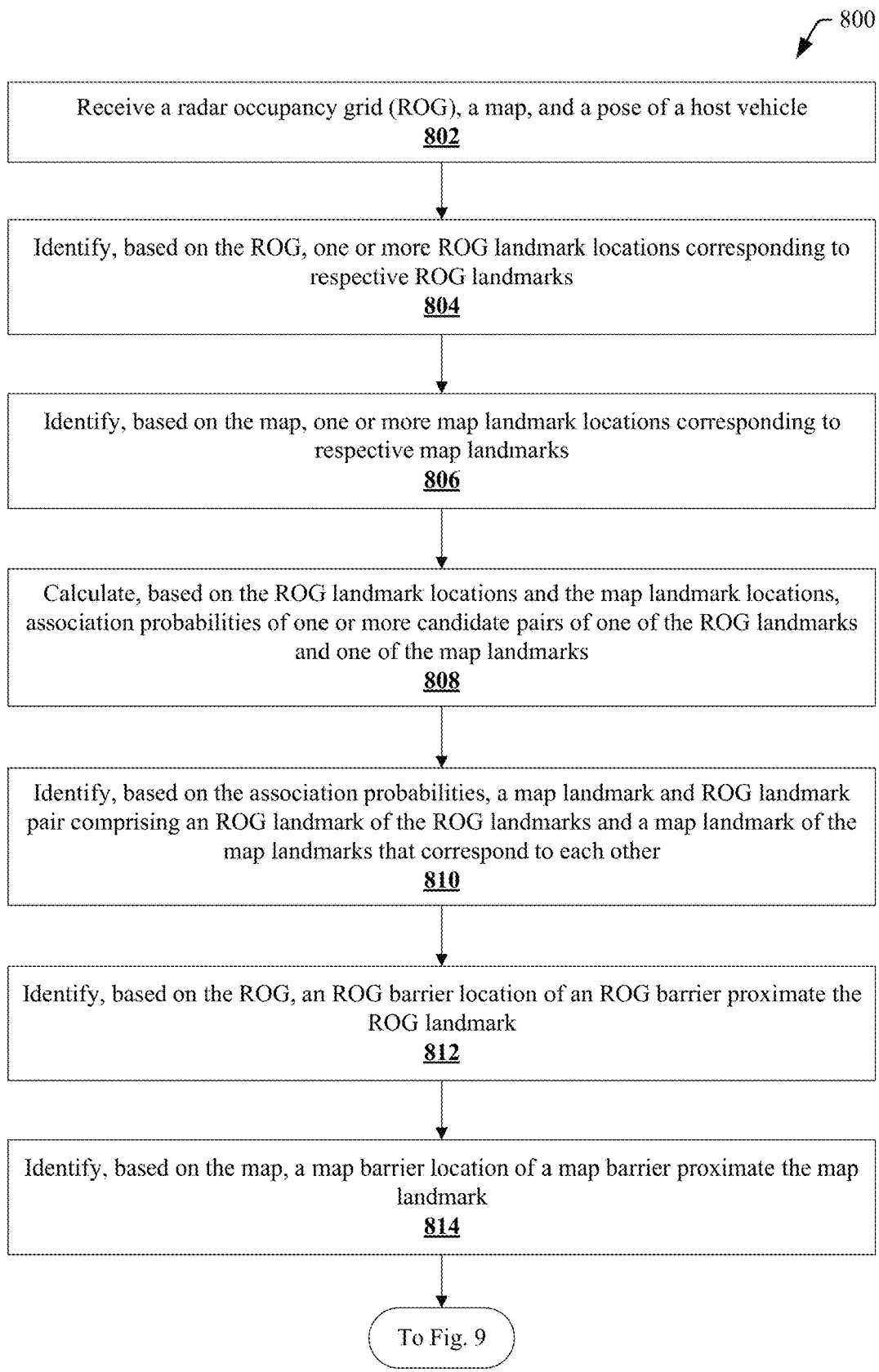
FIGS. 8 and 9 illustrate, in accordance with techniques of this disclosure, an example method of pose correction based on landmarks and barriers.
Figure 9:
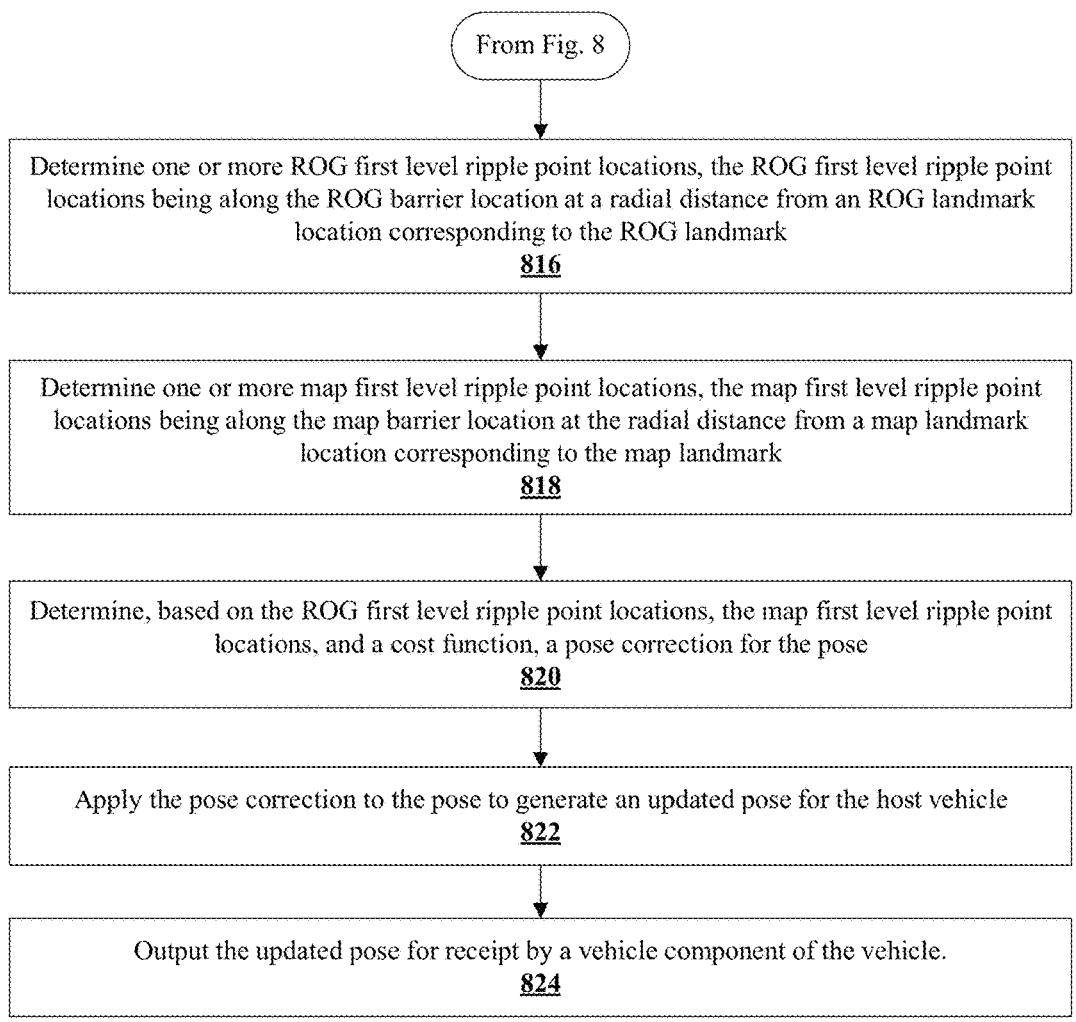

FIGS. 8 and 9 illustrate an example method 800 for pose correction based on landmarks and barriers. The example method 800 may be implemented in any of the previously described environments, by any of the previously described systems or components, and by utilizing any of the previously described flows or techniques. The example method 800 may also be implemented in other environments, by other systems or components, and utilizing other flows or techniques. Example method 800 may be implemented by one or more entities (e.g., the pose correction module 112). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At step 802, an ROG, a map, and a pose of a host vehicle is received. For example, the pose correction module 112 may receive the ROG 114, the map 116, and the pose 118.

At step 804, one or more ROG landmark locations corresponding to respective ROG landmarks is identified based on the ROG. For example, the pose correction module 112 may identify the ROG landmarks 306.

At step 806, one or more map landmark locations corresponding to respective map landmarks is identified based on the map. For example, the pose correction module 112 may identify the map landmarks 310.

At step 808, association probabilities of one or more candidate pairs of one of the ROG landmarks and one of the map landmarks are calculated based on the ROG landmark locations and the map landmark locations. For example, the association probability module 400 may determine the association probabilities 402.

At step 810, a map landmark and ROG landmark pair comprising an ROG landmark of the ROG landmarks and a map landmark of the map landmarks are identified that correspond to each other. For example, the association probability module 400 may identify landmark pair 404 consisting of ROG landmark 306-1 and map landmark 310-1.

At step 812, an ROG barrier location of an ROG barrier is identified based on the ROG. For example, the pose correction module 112 may identify the ROG barrier 308-1.

At step 814, a map barrier location of a map barrier is identified based on the map. For example, the pose correction module 112 may identify the map barrier 312-1.

At step 816, one or more ROG first level ripple point locations are determined. The ROG first level ripple point locations are along the ROG barrier location at a radial distance from an ROG landmark location corresponding to the ROG landmark. For example, the ripple point module 412 may determine first level ripple points of the ROG ripple point locations 414 (e.g., 414-1 for the example of FIG. 5 or 414-1 and 414-2 for the example of FIG. 6).

At step 818, one or more map first level ripple point locations are determined. The map first level ripple point locations are along the map barrier location at the radial distance from a map landmark location corresponding to the map landmark. For example, the ripple point module 412 may determine first level ripple points of the map ripple point locations 416 (e.g., 416-1 for the example of FIG. 5 or 416-1 and 416-2 for the example of FIG. 6).

At step 820, a pose correction is determined for the pose based on the ROG first level ripple point locations, the map first level ripple point locations, and a cost function. For example, the cost module 418 may determine the pose correction 120.

At step 822, the pose correction is applied to the pose to generate an updated pose for the host vehicle. For example, the pose correction module 112 may apply the pose correction 120 to the pose 118 to generate the updated pose 122.

At step 824, the updated pose is output for receipt by a vehicle component of the vehicle. For example, the pose correction module 112 may output the updated pose 122 for receipt by the vehicle component 124.

EXAMPLES

Example 1: A method comprising: receiving, by at least one processor, a radar occupancy grid (ROG), a map, and a pose of a host vehicle; identifying, by the processor and based on the ROG, one or more ROG landmark locations corresponding to respective ROG landmarks; identifying, by the processor and based on the map, one or more map landmark locations corresponding to respective map landmarks; calculating, by the processor and based on the ROG landmark locations and the map landmark locations, association probabilities of one or more candidate pairs of one of the ROG landmarks and one of the map landmarks; identifying, by the processor and based on the association probabilities, a map landmark and ROG landmark pair comprising an ROG landmark of the ROG landmarks and a map landmark of the map landmarks that correspond to each other; identifying, by the processor and based on the ROG, an ROG barrier location of an ROG barrier; identifying, by the processor and based on the map, a map barrier location of a map barrier; determining, by the processor, one or more ROG first level ripple point locations, the ROG first level ripple point locations being along the ROG barrier location at a radial distance from an ROG landmark location corresponding to the ROG landmark; determining, by the processor, one or more map first level ripple point locations, the map first level ripple point locations being along the map barrier location at the radial distance from a map landmark location corresponding to the map landmark; determining, by the processor, based on the ROG first level ripple point locations, the map first level ripple point locations, and a cost function, a pose correction for the pose; applying, by the processor, the pose correction to the pose to generate an updated pose for the host vehicle; and outputting, by the processor, the updated pose for receipt by a vehicle component of the vehicle.

Example 2: The method of example 1, further comprising normalizing, by the processor and based on one or more previous ROG landmark locations of the ROG landmark, the ROG landmark location.

Example 3: The method of example 1 or 2, further comprising executing a machine learning algorithm configured to perform inference on a portion of the ROG to determine the ROG landmark or barrier location.

Example 4: The method of any preceding example, further comprising: determining an offset to the ROG landmark location that is based on a physical size of the map landmark; and applying the offset to the ROG landmark location.

Example 5: The method of example 4, wherein the offset is half of the physical size of the map landmark.

Example 6: The method of any preceding example, further comprising: calculating an ROG distance between the ROG landmark location and the ROG barrier; calculating a map distance between the map landmark location and the map barrier location; and calculating a distance between the ROG distance and the map distance.

Example 7: The method of example 6, wherein determining the ROG first level ripple point locations and determining the map first level ripple point locations are responsive to determining that the distance between the ROG distance and the map distance meets a distance threshold.

Example 8: The method of any preceding example, wherein: the ROG first level ripple point locations being further along a path of the host vehicle or another ROG barrier location at another radial distance from the ROG landmark location; and the map first level ripple point locations being further along the path of the host vehicle or the other map barrier location at the other radial distance from the map landmark location.

Example 9: The method of any preceding example, further comprising: determining, by the processor, one or more ROG second level ripple point locations, the ROG second level ripple point locations being along the ROG barrier location and at the radial distance or another radial distance from the ROG first level ripple point locations; and determining, by the processor, one or more map second level ripple point locations, the map second level ripple point locations being along the map barrier location and at the radial distance or the other radial distance from the map first level ripple point locations, wherein determining the pose correction is based further on the ROG second level ripple point locations and the map second level ripple point locations.

Example 10: The method of any preceding example, wherein the radial distance comprises a shortest distance between the ROG landmark location and the ROG barrier location or between the map landmark location and the map barrier location.

Example 11: The method of any preceding example, wherein the ROG first level ripple point locations and the map first level ripple point locations each comprise a plurality of ripple point locations.

Example 12: The method of any preceding example, wherein the ROG landmark and the map landmark each correspond to a pole, traffic sign, or street light.

Example 13: The method of any preceding example, wherein the ROG barrier and the map barrier each correspond to a guard rail.

Example 14: A system comprising: computer-readable storage media comprising: a radar occupancy grid (ROG); and a map; and at least one processor configured to: receive a pose of a host vehicle; identify, based on the ROG, one or more ROG landmark locations corresponding to respective ROG landmarks; identify, based on the map, one or more map landmark locations corresponding to respective map landmarks; calculate, based on the ROG landmark locations and the map landmark locations, association probabilities of one or more candidate pairs of one of the ROG landmarks and one of the map landmarks; identify, based on the association probabilities, a map landmark and ROG landmark pair comprising an ROG landmark of the ROG landmarks and a map landmark of the map landmarks that correspond to each other; identify, based on the ROG, an ROG barrier location of an ROG barrier; identify, based on the map, a map barrier location of a map barrier; determine one or more ROG first level ripple point locations, the ROG first level ripple point locations being along the ROG barrier location at a radial distance from an ROG landmark location corresponding to the ROG landmark; determine one or more map first level ripple point locations, the map first level ripple point locations being along the map barrier location at the radial distance from a map landmark location corresponding to the map landmark; determine, based on the ROG first level ripple point locations, the map first level ripple point locations, and a cost function, a pose correction for the pose; apply the pose correction to the pose to generate an updated pose for the host vehicle; and output the updated pose for receipt by a vehicle component.

Example 15: The system of example 14, wherein the processor is further configured to: calculate an ROG distance between the ROG landmark location and the ROG barrier; calculate a map distance between the map landmark location and the map barrier location; calculate a distance between the ROG distance and the map distance; and determine whether the distance between the ROG distance and the map distance meets a distance threshold; and determine the ROG first level ripple point locations and determine the map first level ripple point locations responsive to determining that the distance between the ROG distance and the map distance meets the distance threshold.

Example 16: The system of example 14, wherein the processor is further configured to: determine one or more ROG second level ripple point locations, the ROG second level ripple point locations being along the ROG barrier location and at the radial distance or another radial distance from the ROG first level ripple point locations; determine one or more map second level ripple point locations, the map second level ripple point locations being along the map barrier location and at the radial distance or the other radial distance from the map first level ripple point locations; and determine the pose correction based further on the ROG second level ripple point locations and the map second level ripple point locations.

Example 17: The system of example 14, wherein the radial distance is a shortest distance between the ROG landmark location and the ROG barrier location or between the map landmark location and the map barrier location.

Example 18: A computer-readable storage media comprising instructions that, when executed, cause at least one processor to: determine one or more ROG first level ripple point locations, the ROG first level ripple point locations being along an ROG barrier location corresponding to an ROG barrier at a radial distance from an ROG landmark location corresponding to an ROG landmark; determine one or more map first level ripple point locations, the map first level ripple point locations being along a map barrier location corresponding to a map barrier at the radial distance from a map landmark location corresponding to a map landmark; determine, based on the ROG first level ripple point locations, the map first level ripple point locations, and a cost function, a pose correction; apply the pose correction to a pose to generate an updated pose; and output the updated pose for receipt by a vehicle component of the vehicle.

Example 19: The computer-readable storage media of example 18, wherein the instructions further cause the processor to: determine one or more ROG second level ripple point locations, the ROG second level ripple point locations being along the ROG barrier location and at the radial distance or another radial distance from the ROG first level ripple point locations; and determine one or more map second level ripple point locations, the map second level ripple point locations being along the map barrier location and at the radial distance or the other radial distance from the map first level ripple point locations, wherein determining the pose correction is based further on the ROG second level ripple point locations and the map second level ripple point locations.

Example 20: The computer-readable storage media of example 18, wherein the instructions further cause the processor to: identify, based on a radar occupancy grid (ROG), one or more ROG landmark locations corresponding to respective ROG landmarks; identify, based on a map, one or more map landmark locations corresponding to respective map landmarks; calculate, based on the ROG landmark locations and the map landmark locations, association probabilities of one or more candidate pairs of one of the ROG landmarks and one of the map landmarks; identify, based on the association probabilities, the ROG landmark location and the map landmark location; identify, based on the ROG, the ROG barrier location; and identify, based on the map, the map barrier location.

Example 21: A method comprising: determining one or more ROG first level ripple point locations, the ROG first level ripple point locations being along an ROG barrier location corresponding to an ROG barrier at a radial distance from an ROG landmark location corresponding to an ROG landmark; determining one or more map first level ripple point locations, the map first level ripple point locations being along a map barrier location corresponding to a map barrier at the radial distance from a map landmark location corresponding to a map landmark; determining, based on the ROG first level ripple point locations, the map first level ripple point locations, and a cost function, a pose correction; applying the pose correction to a pose to generate an updated pose; and output the updated pose for receipt by a vehicle component of the vehicle.

Example 22: A system comprising: at least one processor configured to perform the method of any of examples 1-13 and 21.

Example 23: Computer-readable storage media comprising instructions that, when executed, cause at least one processor to perform the method of any of examples 1-13 and 21.

Example 24: A system comprising means for performing the method of any of examples 1-13 and 21.

Example 25: A method performed by the system of any of examples 14-17.

Example 26: A method comprised by the instructions of example 18.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
receiving, by at least one processor, a radar occupancy grid (ROG), a map, and a pose of a host vehicle;
identifying, by the processor and based on the ROG, one or more ROG landmark locations corresponding to respective ROG landmarks;
identifying, by the processor and based on the map, one or more map landmark locations corresponding to respective map landmarks;
calculating, by the processor and based on the ROG landmark locations and the map landmark locations, association probabilities of one or more candidate pairs of one of the ROG landmarks and one of the map landmarks;
identifying, by the processor and based on the association probabilities, a map landmark and ROG landmark pair comprising an ROG landmark of the ROG landmarks and a map landmark of the map landmarks that correspond to each other;
identifying, by the processor and based on the ROG, an ROG barrier location of an ROG barrier;
identifying, by the processor and based on the map, a map barrier location of a map barrier;
determining, by the processor, one or more ROG first level ripple point locations, the ROG first level ripple point locations being along the ROG barrier location at a radial distance from an ROG landmark location corresponding to the ROG landmark;
determining, by the processor, one or more map first level ripple point locations, the map first level ripple point locations being along the map barrier location at the radial distance from a map landmark location corresponding to the map landmark;
determining, by the processor, based on the ROG first level ripple point locations, the map first level ripple point locations, and a cost function, a pose correction for the pose;
applying, by the processor, the pose correction to the pose to generate an updated pose for the host vehicle;
outputting, by the processor, the updated pose for receipt by a vehicle component of the host vehicle; and
controlling at least one of accelerating, braking and steering of the host vehicle based on the updated pose.

2. The method of claim 1, further comprising normalizing, by the processor and based on one or more previous ROG landmark locations of the ROG landmark, the ROG landmark location.

3. The method of claim 1, further comprising executing a machine learning algorithm configured to perform inference on a portion of the ROG to determine the ROG landmark location and the ROG barrier location.

4. The method of claim 1, further comprising:
determining an offset to the ROG landmark location that is based on a physical size of the map landmark; and
applying the offset to the ROG landmark location.

5. The method of claim 4, wherein the offset is half of the physical size of the map landmark.

6. The method of claim 1, further comprising:
calculating an ROG distance between the ROG landmark location and the ROG barrier;
calculating a map distance between the map landmark location and the map barrier location; and
calculating a distance between the ROG distance and the map distance.

7. The method of claim 6, wherein determining the ROG first level ripple point locations and determining the map first level ripple point locations are responsive to determining that the distance between the ROG distance and the map distance meets a distance threshold.

8. The method of claim 1, wherein:
the ROG first level ripple point locations being further along a path of the host vehicle or another ROG barrier location at another radial distance from the ROG landmark location; and
the map first level ripple point locations being further along the path of the host vehicle or the other map barrier location at the other radial distance from the map landmark location.

9. The method of claim 1, further comprising:
determining, by the processor, one or more ROG second level ripple point locations, the ROG second level ripple point locations being along the ROG barrier location and at the radial distance or another radial distance from the ROG first level ripple point locations; and
determining, by the processor, one or more map second level ripple point locations, the map second level ripple point locations being along the map barrier location and at the radial distance or the other radial distance from the map first level ripple point locations,
wherein determining the pose correction is based further on the ROG second level ripple point locations and the map second level ripple point locations.

10. The method of claim 1, wherein the radial distance comprises a shortest distance between the ROG landmark location and the ROG barrier location or between the map landmark location and the map barrier location.

11. The method of claim 1, wherein the ROG first level ripple point locations and the map first level ripple point locations each comprise a plurality of ripple point locations.

12. The method of claim 1, wherein the ROG landmark and the map landmark each correspond to a pole, traffic sign, or street light.

13. The method of claim 1, wherein the ROG barrier and the map barrier each correspond to a guardrail.

14. A system comprising:
computer-readable storage media comprising:
a radar occupancy grid (ROG); and
a map; and
at least one processor configured to:
receive a pose of a host vehicle;
identify, based on the ROG, one or more ROG landmark locations corresponding to respective ROG landmarks;
identify, based on the map, one or more map landmark locations corresponding to respective map landmarks;
calculate, based on the ROG landmark locations and the map landmark locations, association probabilities of one or more candidate pairs of one of the ROG landmarks and one of the map landmarks;
identify, based on the association probabilities, a map landmark and ROG landmark pair comprising an ROG landmark of the ROG landmarks and a map landmark of the map landmarks that correspond to each other;
identify, based on the ROG, an ROG barrier location of an ROG barrier;
identify, based on the map, a map barrier location of a map barrier;
determine one or more ROG first level ripple point locations, the ROG first level ripple point locations being along the ROG barrier location at a radial distance from an ROG landmark location corresponding to the ROG landmark;
determine one or more map first level ripple point locations, the map first level ripple point locations being along the map barrier location at the radial distance from a map landmark location corresponding to the map landmark;
determine, based on the ROG first level ripple point locations, the map first level ripple point locations, and a cost function, a pose correction for the pose;
apply the pose correction to the pose to generate an updated pose for the host vehicle;
output the updated pose for receipt by a vehicle component; and
control at least one of accelerating, braking and steering of the host vehicle based on the updated pose.

15. The system of claim 14, wherein the processor is further configured to:
calculate an ROG distance between the ROG landmark location and the ROG barrier;
calculate a map distance between the map landmark location and the map barrier location;
calculate a distance between the ROG distance and the map distance; and
determine whether the distance between the ROG distance and the map distance meets a distance threshold; and
determine the ROG first level ripple point locations and determine the map first level ripple point locations responsive to determining that the distance between the ROG distance and the map distance meets the distance threshold.

16. The system of claim 14, wherein the processor is further configured to:
determine one or more ROG second level ripple point locations, the ROG second level ripple point locations being along the ROG barrier location and at the radial distance or another radial distance from the ROG first level ripple point locations;
determine one or more map second level ripple point locations, the map second level ripple point locations being along the map barrier location and at the radial distance or the other radial distance from the map first level ripple point locations; and
determine the pose correction based further on the ROG second level ripple point locations and the map second level ripple point locations.

17. The system of claim 14, wherein the radial distance is a shortest distance between the ROG landmark location and the ROG barrier location or between the map landmark location and the map barrier location.

18. A non-transitory computer-readable storage media comprising instructions that, when executed, cause at least one processor to:
determine one or more ROG first level ripple point locations, the ROG first level ripple point locations being along an ROG barrier location corresponding to an ROG barrier at a radial distance from an ROG landmark location corresponding to an ROG landmark;
determine one or more map first level ripple point locations, the map first level ripple point locations being along a map barrier location corresponding to a map barrier at the radial distance from a map landmark location corresponding to a map landmark;
determine, based on the ROG first level ripple point locations, the map first level ripple point locations, and a cost function, a pose correction;

determine one or more ROG second level ripple point locations, the ROG second level ripple point locations being along the ROG barrier location and at the radial distance or another radial distance from the ROG first level ripple point locations;

determine one or more map second level ripple point locations, the map second level ripple point locations being along the map barrier location and at the radial distance or the other radial distance from the map first level ripple point locations, wherein determining the pose correction is based further on the ROG second level ripple point locations and the map second level ripple point locations;

apply the pose correction to a pose of a host vehicle to generate an updated pose of the host vehicle;

output the updated pose for receipt by a vehicle component of the host vehicle; and control at least one of accelerating, braking and steering of the host vehicle based on the updated pose.

19. A non-transitory computer-readable storage media comprising instructions that, when executed, cause at least one processor to:

identify, based on a radar occupancy grid (ROG), one or more ROG landmark locations corresponding to respective ROG landmarks;

identify, based on a map, one or more map landmark locations corresponding to respective map landmarks;

determine one or more ROG first level ripple point locations, the ROG first level ripple point locations being along an ROG barrier location corresponding to an ROG barrier at a radial distance from an ROG landmark location corresponding to an ROG landmark;

determine one or more map first level ripple point locations, the map first level ripple point locations being along a map barrier location corresponding to a map barrier at the radial distance from a map landmark location corresponding to a map landmark;

determine, based on the ROG first level ripple point locations, the map first level ripple point locations, and a cost function, a pose correction;

calculate, based on the ROG landmark locations and the map landmark locations, association probabilities of one or more candidate pairs of one of the ROG landmarks and one of the map landmarks;

identify, based on the association probabilities, the ROG landmark location and the map landmark location;

identify, based on the ROG, the ROG barrier location;

identify, based on the map, the map barrier location;

apply the pose correction to a pose of a host vehicle to generate an updated pose of the host vehicle;

output the updated pose for receipt by a vehicle component of the host vehicle; and control at least one of accelerating, braking and steering of the host vehicle based on the updated pose.

* * * * *